(12) United States Patent
Kim et al.

(10) Patent No.: US 7,734,903 B2
(45) Date of Patent: Jun. 8, 2010

(54) MULTI-PROCESSOR SYSTEM AND METHOD FOR CONTROLLING RESET AND PROCESSOR ID THEREOF

(75) Inventors: Young Woo Kim, Daejeon (KR); Sung Nam Kim, Daejeon (KR); Kyoung Park, Daejeon (KR); Seong Woon Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 740 days.

(21) Appl. No.: 11/633,811

(22) Filed: Dec. 5, 2006

(65) Prior Publication Data

US 2007/0136567 A1    Jun. 14, 2007

(30) Foreign Application Priority Data

Dec. 8, 2005   (KR) ...................... 10-2005-0120055
Apr. 13, 2006  (KR) ...................... 10-2006-0033537

(51) Int. Cl.
*G06F 9/00* (2006.01)
(52) U.S. Cl. .......................................... 713/1; 713/100
(58) Field of Classification Search ..................... 713/1, 713/100
See application file for complete search history.

(56) References Cited

U.S. PATENT DOCUMENTS

| | | | | |
|---|---|---|---|---|
| 5,497,497 A | * | 3/1996 | Miller et al. | .................... 713/1 |
| 5,729,675 A | * | 3/1998 | Miller et al. | .................... 714/36 |
| 6,314,515 B1 | | 11/2001 | Miller et al. | |
| 6,401,197 B1 | * | 6/2002 | Kondo | ............................ 713/1 |
| 7,246,222 B2 | * | 7/2007 | Chheda et al. | ................... 713/1 |
| 2004/0210750 A1 | * | 10/2004 | Chheda et al. | ................... 713/1 |
| 2005/0235166 A1 | * | 10/2005 | England et al. | .............. 713/193 |

FOREIGN PATENT DOCUMENTS

| | | |
|---|---|---|
| JP | 11-031068 | 2/1999 |
| KR | 10-0201399 | 3/1999 |

* cited by examiner

*Primary Examiner*—Chun Cao
(74) *Attorney, Agent, or Firm*—Ladas & Parry LLP

(57) ABSTRACT

Provided are a microprocessor suitable for constructing a multi-processor system and a method for controlling the reset and processor ID of the microprocessor. The microprocessor includes decoder receiving a reset ID having a predetermined binary value and a reset signal and decoding the reset ID, an ID generator receiving the decoding result of the decoder and generating at least one microprocessor ID and a reset ID of a microprocessor serially connected to the microprocessor, and a reset vector unit selecting a reset vector according to the decoding result of the decoder. The multi-processor system is constructed such that independent microprocessors of the system respectively generate their own reset vectors and processor IDs when a reset signal is input to the multi-processor system to initialize it. Thus, all the microprocessors of the system can be simultaneously started up when the reset signal is disabled. Accordingly, a resetting process in the multi-processor system is simplified, a period of time required for starting up the microprocessor is reduced, and the multi-processor system is easily designed.

12 Claims, 4 Drawing Sheets

MULTI-PROCESSOR SYSTEM AND METHOD FOR CONTROLLING RESET AND PROCESSOR ID THEREOF

CROSS-REFERENCE TO RELATED PATENT APPLICATION

This application claims the benefit of Korean Patent Application Nos. 10-2005-0120055, filed on Dec. 8, 2005 and 10-2006-0033537, filed on Apr. 13, 2006 in the Korean Intellectual Property Office, the disclosures of which are incorporated herein in their entirety by reference.

BACKGROUND OF THE INVENTION

1. Field of the Invention

The present invention relates to a microprocessor capable of constructing a multi-microprocessor system having a plurality of microprocessors connected in series, and more particularly, to a microprocessor suitable for constructing a multi-microprocessor system in which a microprocessor receives reset information from the previous microprocessor, selects its own reset vector from a reset vector table and simultaneously generates its own processor ID and a reset ID to be transmitted to the next microprocessor.

2. Description of the Related Art

In a conventional multi-processor system, all of microprocessors of the system have the same reset vector. Accordingly, the multi-processor system must use a arbiter that makes the microprocessors of the system use a single reset vector to allow the microprocessors to be sequentially started up using an external complicated algorithm. Furthermore, when the multi-processor system uses a shared system bus, the respective microprocessors must have their own processor IDs in order to use the shared system bus. In this case, an additional arbiter is also needed to arbitrate the access of the microprocessors to the shared system bus.

U.S. Pat. No. 6,314,515 B1 applied by Compaq Computer Corporation and entitled "Resetting Multiple Processors in a Computer System" discloses a system using two processors $P_1$ and $P_Z$. In this system, a reset signal required for initializing the system is applied to the processor $P_1$ to start up the processor $P_1$ while the processor $P_Z$ is held using an inter-processor communication module such that the processor $P_1$ ends a process required for initializing the system and then the processor $P_Z$ is started. That is, this system has an external inter-processor communication module for initializing more than two processors and holds one of the processors while the other processor is started up to secure initialization of the processors. However, this technique has shortcomings that initialization of the processors must be arbitrated using a complicated external arbiter circuit and algorithm and only one processor can be started at a time.

Japanese Patent No. 11-21068 applied by Doshiba Corporation and entitled "Reset vector switching method and information processor using the same" discloses a technique that receives a plurality of reset signals, generates a reset vector in response to the reset signals and changes an initialization address of a microprocessor in response to a reset signal input when the microprocessor is started. This technique requires a plurality of reset signals and prevents erroneous initialization of a program due to hardware failure in a single processor system. However, this technique must use an external arbiter similar to the arbiter of the aforementioned U.S. Patent to be applied to a multi-processor system.

Korean Patent No. 10-0201399 applied by LG Semiconductor Corporation and entitled "Reset interrupt circuit" discloses a system that receives port state inputs in addition to a reset signal and combines the port state inputs to select a new reset vector. This technique requires a plurality of port state inputs, selects a program in response to the state of external hardware and initializes the selected program in a single processor system. This system also needs an external arbiter similar to that of the aforementioned U.S. Patent system to be applied to a multi-processor system.

SUMMARY OF THE INVENTION

The present invention provides a microprocessor suitable for constructing a multi-processor system in which respective microprocessors connected in series automatically select their own reset vectors from a plurality of reset vectors stored in the system to be started and generate their own processor IDs to secure access to a shared system bus, a method for controlling the reset and processor ID of the microprocessor, and a computer readable recording medium storing a program capable of executing the method.

According to an aspect of the present invention, there is provided a microprocessor suitable for constructing a multi-processor system, the microprocessor comprising: a decoder receiving a reset ID having a predetermined binary value and a reset signal and decoding the reset ID; an ID generator receiving the decoding result of the decoder and generating at least one microprocessor ID and a reset ID of a microprocessor serially connected to the microprocessor; and a reset vector unit selecting a reset vector according to the decoding result of the decoder.

The reset vector unit comprises a reset vector table storing at least one reset vector, and a reset vector selector selecting a reset vector corresponding to the reset ID from the reset vector table and setting the reset vector as a start address after the microprocessor has been reset.

The ID generator comprises a processor ID generator generating a processor ID of the microprocessor based on the reset ID, and a reset ID generator generating a reset ID of the next microprocessor connected to the microprocessor.

The reset ID is received from a previous microprocessor that has the same configuration as the microprocessor and is serially connected to the microprocessor.

According to another aspect of the present invention, there is provided a method for controlling a reset ID and processor ID of a microprocessor suitable for constructing a multi-processor system, the method comprising: preparing at least one reset vector; determining whether a received reset signal is enabled; receiving a reset ID from a microprocessor serially connected to the microprocessor, decoding the reset ID according to the enabled state of the reset signal on the basis of the reset signal to generate at least one ID, and selecting one of the at least one reset vector when the reset signal is enabled; and maintaining the current ID and reset vector when the reset signal is disabled.

The receiving a reset ID from a microprocessor serially connected to the microprocessor, decoding the reset ID and selecting one of the at least one reset vector when the reset signal is enabled comprises generating a processor ID of the microprocessor; generating a reset ID to be provided to the next microprocessor serially connected to the microprocessor; and determining whether the reset signal is disabled, generating the processor ID of the microprocessor when the reset signal is enabled, and maintaining the generated processor ID, reset ID and reset vector when the reset signal is disabled.

According to another aspect of the present invention, there is provided a computer readable recording medium storing a program executing in a computer a method of for controlling a reset ID and processor ID of a microprocessor suitable for constructing a multi-processor system, the method comprising: preparing at least one reset vector; determining whether a received reset signal is enabled; receiving a reset ID from a microprocessor serially connected to the microprocessor, decoding the reset ID according to the enabled state of the reset signal on the basis of the reset signal to generate at least one ID, and selecting one of the at least one reset vector when the reset signal is enabled; and maintaining the current ID and reset vector when the reset signal is disabled.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
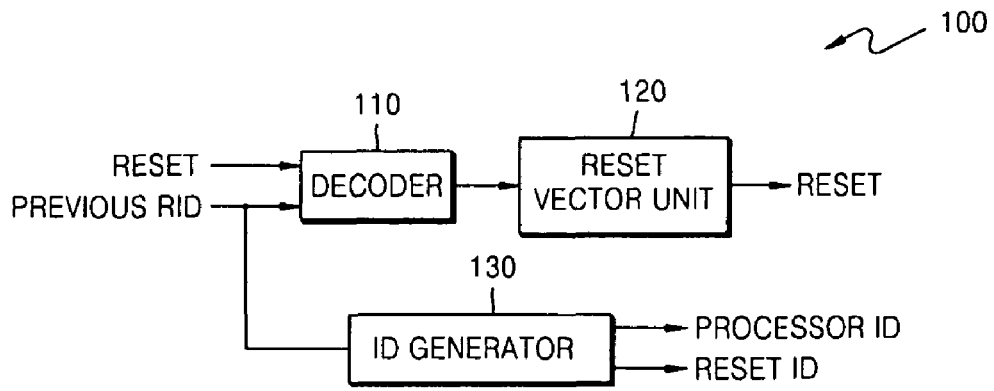
FIG. 1 is a block diagram of a microprocessor according to the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 2:
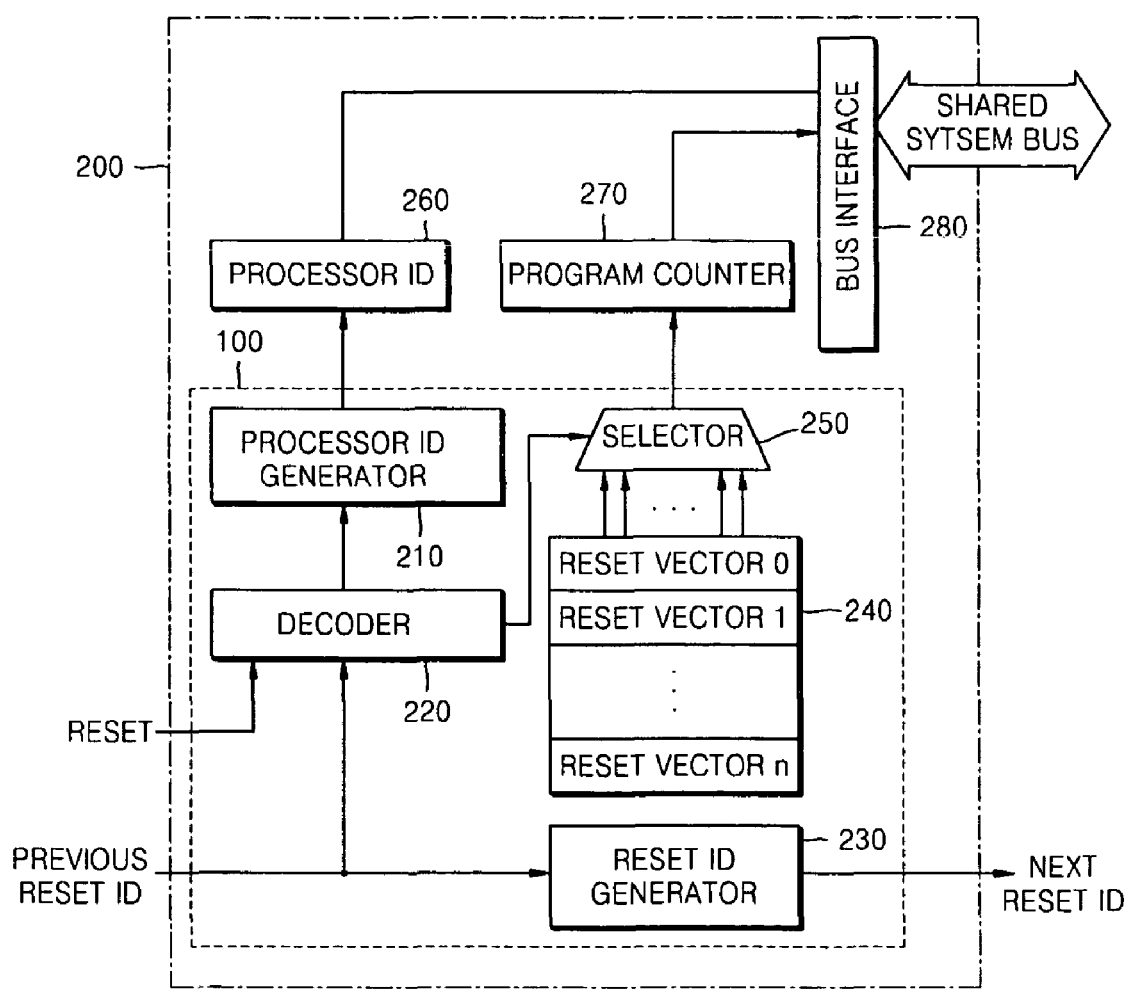
FIG. 2 is a block diagram illustrating the detailed configuration of the microprocessor according to the present invention.
Figure 3:
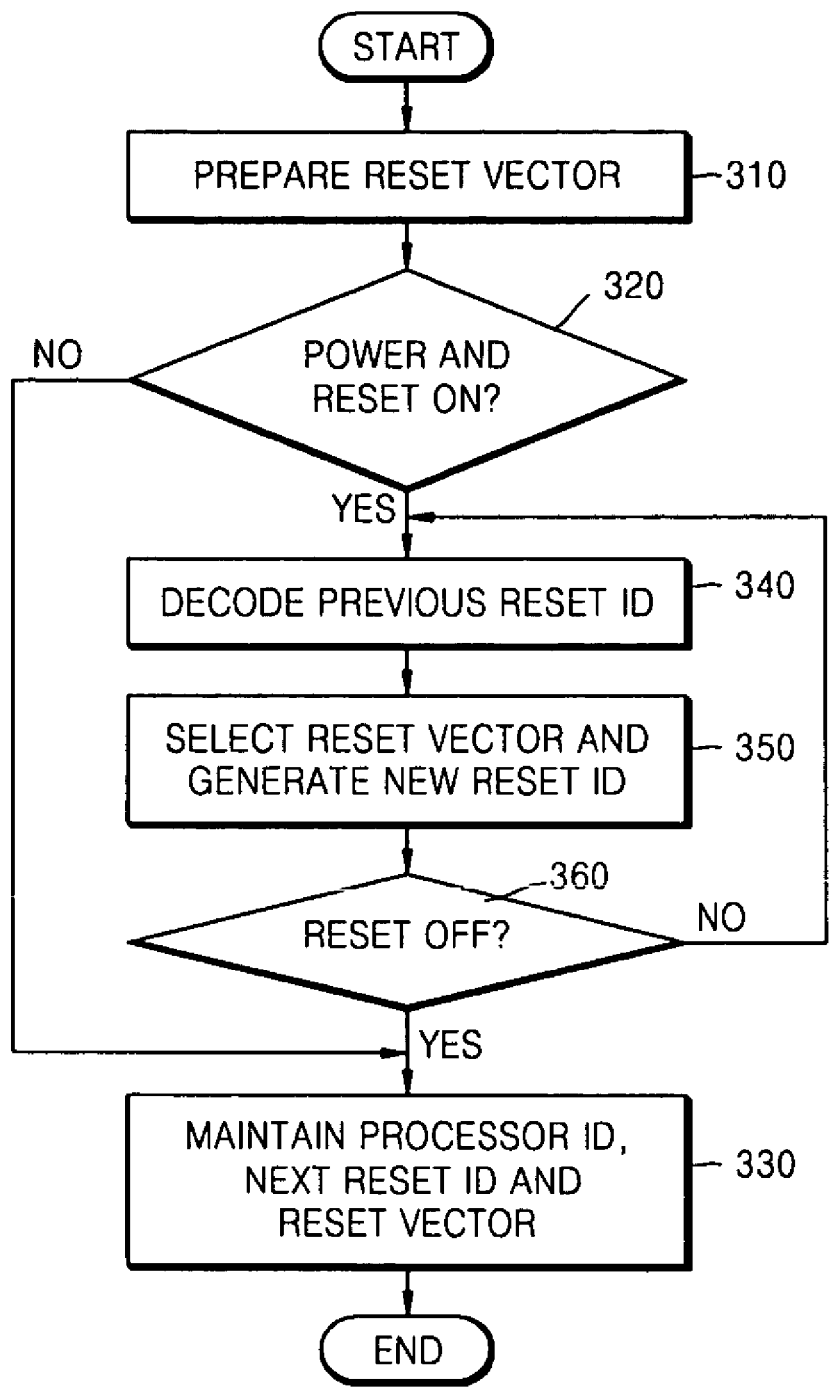
FIG. 3 is a flow chart of an operation of resetting a microprocessor and generating a processor ID of the microprocessor according to the present invention.
Figure 4:
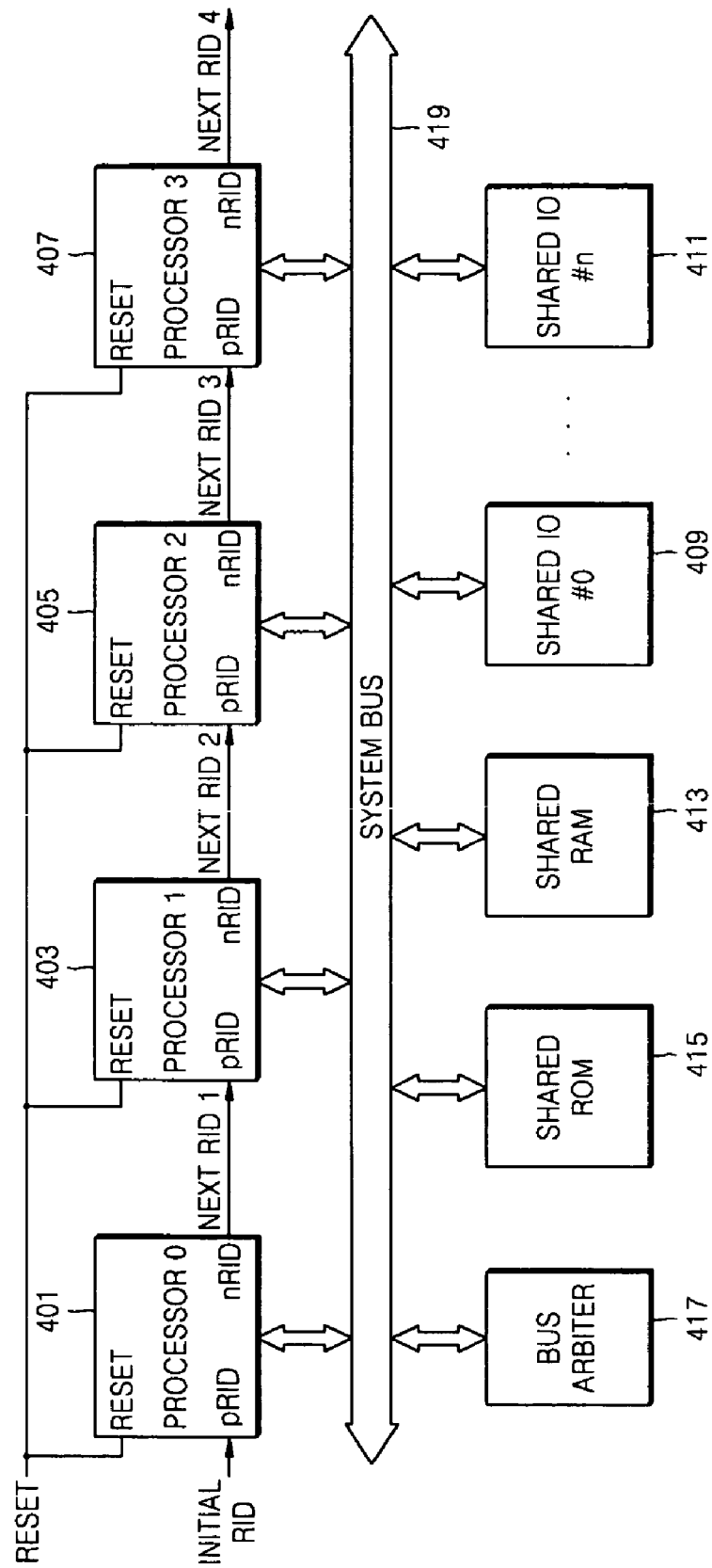
FIG. 4 illustrates a multi-processor system using the microprocessor according to the present invention.
Figure 5:
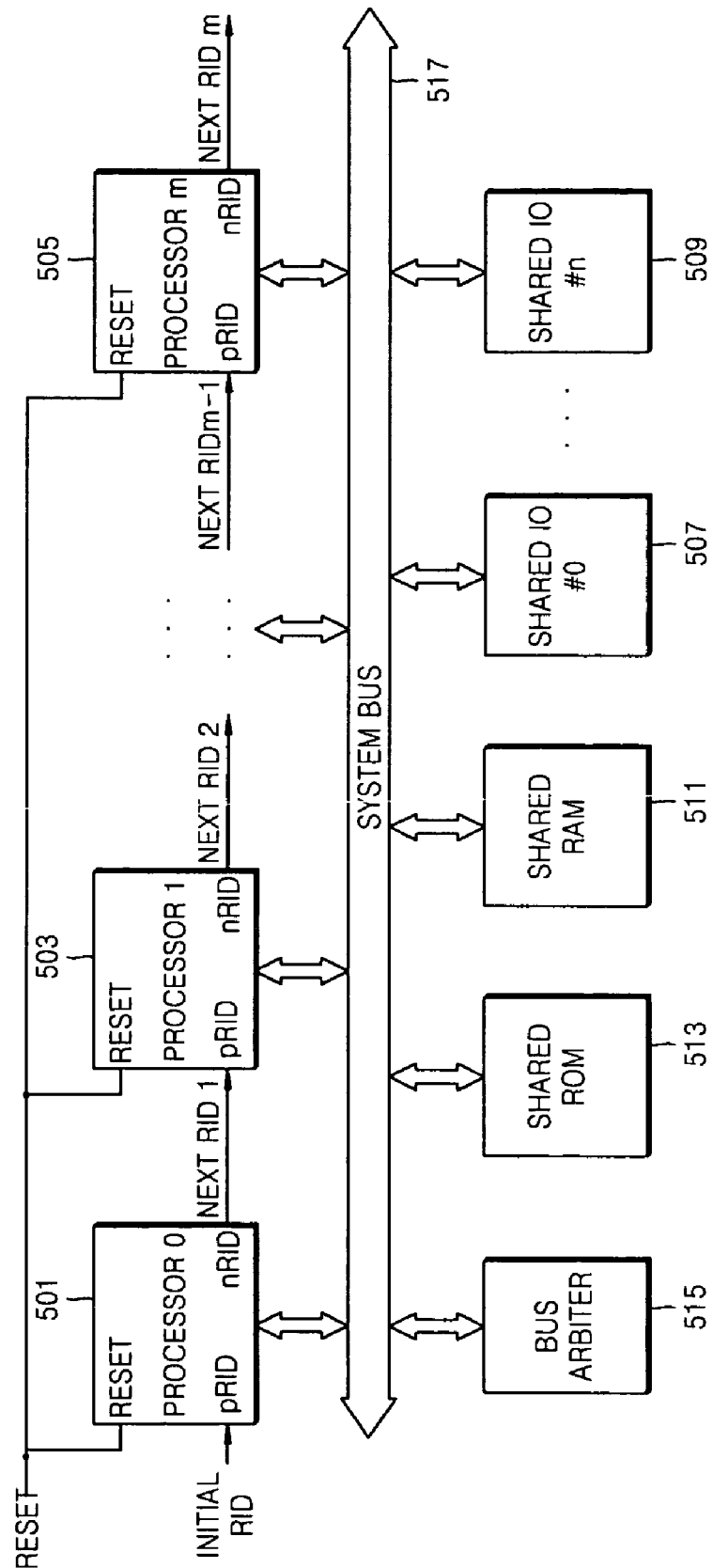
FIG. 5 illustrates an extended multi-processor system using the microprocessor according to the present invention.

FIG. 1 is a block diagram of a microprocessor 100 according to the present invention, FIG. 2 is a block diagram illustrating the detailed configuration of the microprocessor according to the present invention, and FIG. 3 is a flow chart of an operation of resetting a microprocessor and generating a processor ID of the microprocessor according to the present invention. FIG. 4 illustrates a multi-processor system using the microprocessor according to the present invention, and FIG. 5 illustrates an extended multi-processor system using the microprocessor according to the present invention.

Referring to FIG. 1, the microprocessor 100 according to the present invention includes a decoder 110, a reset vector unit 120 and an ID generator 130. The decoder receives a reset ID having a predetermined binary value and a reset signal, decodes the reset ID and transmits the decoded reset ID to the next block. The ID generator 130 receives the decoding result of the decoder 110 and generates at least one processor ID and a reset ID of the next microprocessor serially connected to the current microprocessor 100. The reset vector unit 120 receives the decoding result of the decoder 110 and selects a reset vector.

The functions of the respective blocks of the microprocessor 100 of FIG. 1 will be explained in detail with reference to FIG. 2. Referring to FIG. 2, the microprocessor 200 includes a decoder 220, a reset vector selector 250, a reset vector table 240, a reset ID generator 230 generating a reset ID of the next microprocessor, and a processor ID generator 210. The ID generator 130 of FIG. 1 includes the processor ID generator 210 and the reset ID generator 230 of FIG. 2. The reset vector unit 120 of FIG. 1 includes the selector 250 and the reset vector table 240 of FIG. 2. When a multi-processor system is constructed by using m microprocessors according to the present invention, the bit width of a previous reset ID pRID and a next reset ID nRID correspond to a value obtained by rounding off $\log_2(m)$. That is, in the case of a multi-processor system of FIG. 4, the bit width is 2 bit corresponding to $\log_2(4)$ because the multi-processor system has four microprocessors.

The decoder 220 receives the previous reset ID pRID corresponding to the next reset ID nRID of the previous microprocessor, decodes the previous reset ID pRID and transmits the decoding result to the selector 250 and the processor ID generator 210. The selector 250 selects a reset vector corresponding to a reset ID selected from the reset vector table 240 composed of at least m reset vectors and transmits the selected reset vector to a program counter 270 to set the reset vector as a start address for starting up a program after reset is cancelled. The processor ID generator 210 receives the decoding result of the decoder 220 and generates a processor ID PID of the microprocessor 100. A method of generating the processor ID is not limited by the present invention. However, it is preferable that a processor ID reference value is previously set and a reset ID value is added thereto to generate a processor ID.

The generated processor ID is stored in a processor ID register 260 such that, when the microprocessor 100 accesses a system bus through a bus interface 280, the access of the microprocessor 100 is distinguished using the processor ID from the access of other microprocessors in a multi-processor system.

The microprocessor 100 according to the present invention generates its own reset vector and processor ID and, simultaneously, generates a reset ID to be used by the next microprocessor serially connected thereto using the reset ID generator 230. A method of generating the reset ID using the reset ID generator 230 Is not limited by the present invention. However, it is preferable that the reset ID generator 230 generates the reset ID using an adder.

The microprocessors of the multi-processor system are serially connected with the first microprocessor having an initial reset ID. Thus, the reset ID generator 230 can be configured such that the next microprocessor has a reset ID corresponding to previous reset ID pRID+1. In a multi-processor system illustrated in FIG. 4, which will be explained later, when the previous reset ID pRID is increased by 1 using an adder, reset IDs 0, 1, 2 and 3 are sequentially allocated to microprocessors 401 through 407 when the initial reset ID is 0.

FIG. 3 is a flow chart of an operation of generating a reset ID and a processor ID of the microprocessor according to the present invention. Referring to FIG. 3, a reset vector table storing reset vectors is prepared in step 310. When a system including a plurality of microprocessors each having the configuration of FIG. 2 is powered on, each microprocessor checks whether a reset signal is input in step 320. When the reset signal is not input, each microprocessor maintains an initial value in step 330. When the reset signal is input, each microprocessor decodes a previous reset ID in step 340 and determines a reset vector, a processor ID and the nest reset ID nRID according to the decoding result in step 350. Then, each microprocessor checks the reset signal in step 360 and repeats steps 340 and 350 if the reset signal is not disabled. If the reset signal is disabled, each microprocessor maintains the generated reset vector, processor ID and next reset ID nRID in step 330 to perform initialization.

As can be known from FIGS. 1, 2 and 3, the reset vector and the processor ID are determined before reset is cancelled. Accordingly, when a multi-processor system as illustrated in FIG. 4 or 5 is constructed using the microprocessor according to the present invention, microprocessors constructing the system can be independently started up without having collision of system bus access when reset is disabled.

FIG. 4 illustrates an example of a multi-processor system using the microprocessor according to the present invention. The multi-processor system includes four microprocessors 401, 403, 405 and 407, a system bus 419 shared by the four microprocessors 401, 403, 405 and 407, a bus arbiter 417 for arbitrating accesses of the microprocessors 401, 403, 405 and 407 to the system bus 419, shared memories 413 and 415 connected to the system bus 419, and shared input/output devices 409 and 411. Each of the microprocessors 401, 403, 405 and 407 receives a previous microprocessor reset ID pRID and a reset signal and outputs the next reset ID nRID. Each microprocessor outputs the next reset ID nRID to the next microprocessor as a previous reset ID pRID such that all the microprocessors 401, 403, 405 and 407 are connected in series. The first microprocessor 401 receives an initial reset ID RID as the previous reset ID pRID. The next reset ID nRID output from the last microprocessor 407 is in an open state. Each of the microprocessors 401, 403, 405 and 407 connects the previous reset ID pRID input thereto to the next reset ID nRID such that all the microprocessors 401, 403, 405 and 407 are serially connected. Accordingly, each microprocessor acquires reset information at its position in the serial connection state, processes the reset information and transmits the processed information to the next microprocessor to set a reset vector thereof.

FIG. 5 illustrates a configuration of a multi-processor system obtained by extending the multi-processor system of FIG. 4. Microprocessors 501, 502, 503, 504 and 505 constructing the multi-processor system are connected in series using previous reset ID signal lines and next reset ID signal lines. The multi-processor system includes a system bus 517 shared by the microprocessors 501, 502, 503, 504 and 505, a bus arbiter 515 for arbitrating accesses of the microprocessors 501, 502, 503 and 405 to the system bus 517, shared memories 511 an 513 connected to the system bus 517, and shared input/output devices 507 and 509. Each of the microprocessors 501, 502, 503, 504 and 505 selects its own reset vector before a reset signal applied to the system is disabled. Accordingly, all the microprocessors of the multi-processor system are simultaneously started up after the reset signal is disabled The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

As described above, the present invention constructs a multi-processor system such that independent microprocessors of the system respectively generate their own reset vectors and processor IDs when a reset signal is input to the multi-processor system to initialize it. Thus, all the microprocessors of the system can be simultaneously started up when the reset signal is disabled. Accordingly, a resetting process in the multi-processor system is simplified, a period of time required for starting up the microprocessor is reduced, and the multi-processor system is easily designed. Furthermore, the microprocessors of the multi-processor system automatically generate their processor IDs so that the system resource can be easily shared using a single system bus and the system can be constructed without using an external separate arbiter. Moreover, when the microprocessor according to the present invention is applied to an embedded system, the embedded system can be easily constructed and the function and performance of the embedded system can be easily extended.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A microprocessor suitable for constructing a multi-processor system, the microprocessor comprising:
    a decoder receiving a reset ID having a predetermined binary value and a reset signal and decoding the reset ID;
    an ID generator receiving the decoding result of the decoder and generating at least one microprocessor ID and a reset ID of a next microprocessor serially connected to the microprocessor; and
    a reset vector unit selecting a reset vector according to the decoding result of the decoder.

2. The microprocessor of claim 1, wherein the reset vector unit comprises:
    a reset vector table storing at least one reset vector; and
    a reset vector selector selecting a reset vector corresponding to the reset ID from the reset vector table and setting the reset vector as a start address after the microprocessor has been reset.

3. The microprocessor of claim 1, wherein the ID generator comprises:
    a processor ID generator generating a processor ID of the microprocessor based on the reset ID; and
    a reset ID generator generating a reset ID of the next microprocessor connected to the microprocessor.

4. The microprocessor of claim 1, wherein the reset ID is received from a previous microprocessor that has the same configuration as the microprocessor and is serially connected to the microprocessor.

5. The microprocessor of claim 3, wherein the processor ID generator performs a predetermined arithmetical process including the four arithmetical operations on the binary value of the reset ID to generate the reset ID of the next microprocessor.

6. The microprocessor of claim 3, wherein the reset ID generator performs a predetermined arithmetical process including the four arithmetical operations on the binary value of the reset ID to generate the reset ID of the next microprocessor.

7. The microprocessor of claim 1, wherein the reset ID has a value obtained by rounding off $\log_2 n$ when the mufti-processor system has n microprocessors serially connected.

8. The microprocessor of claim 1, wherein the microprocessor and other microprocessors which have the same configuration as the microprocessor and are serially connected thereto are simultaneously started up after the reset signal is disabled.

9. A method for controlling a reset ID and processor ID of a microprocessor suitable for constructing a multi-processor system, the method comprising:
preparing at least one reset vector;
determining whether a received reset signal is enabled;
receiving a reset ID from a previous microprocessor serially connected to the microprocessor, decoding the reset ID according to an enabled state of the reset signal on the basis of the reset signal to generate at least one ID, and selecting one of the at least one reset vector when the reset signal is enabled; and
maintaining a current ID and reset vector when the reset signal is disabled.

10. The method of claim 9, wherein the receiving a reset ID from a microprocessor serially connected to the microprocessor, decoding the reset ID and selecting one of the at least one reset vector when the reset signal is enabled comprises:
generating a processor ID of the microprocessor;
generating a reset ID to be provided to the next microprocessor serially connected to the microprocessor; and
determining whether the reset signal is disabled, generating the processor ID of the microprocessor when the reset signal is enabled, and maintaining the generated processor ID, reset ID and reset vector when the reset signal is disabled.

11. The method of claim 10, wherein, in the generating a reset ID, a predetermined arithmetical process including the four arithmetical operations is performed on the reset ID to generate the reset ID to be provided to the next microprocessor.

12. A computer readable recording medium storing a program executing in a computer a method of for controlling a reset ID and processor ID of a microprocessor suitable for constructing a multi-processor system, the method comprising:
preparing at least one reset vector;
determining whether a received reset signal is enabled;
receiving a reset ID from a previous microprocessor serially connected to the microprocessor, decoding the reset ID according to an enabled state of the reset signal on the basis of the reset signal to generate at least one ID, and selecting one of the at least one reset vector when the reset signal is enabled; and
maintaining a current ID and reset vector when the reset signal is disabled.

* * * * *